(No Model.)  2 Sheets—Sheet 1.
M. THÖNI.
ROUNDABOUT.
No. 247,858.  Patented Oct. 4, 1881.
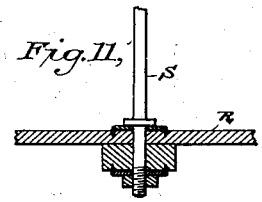
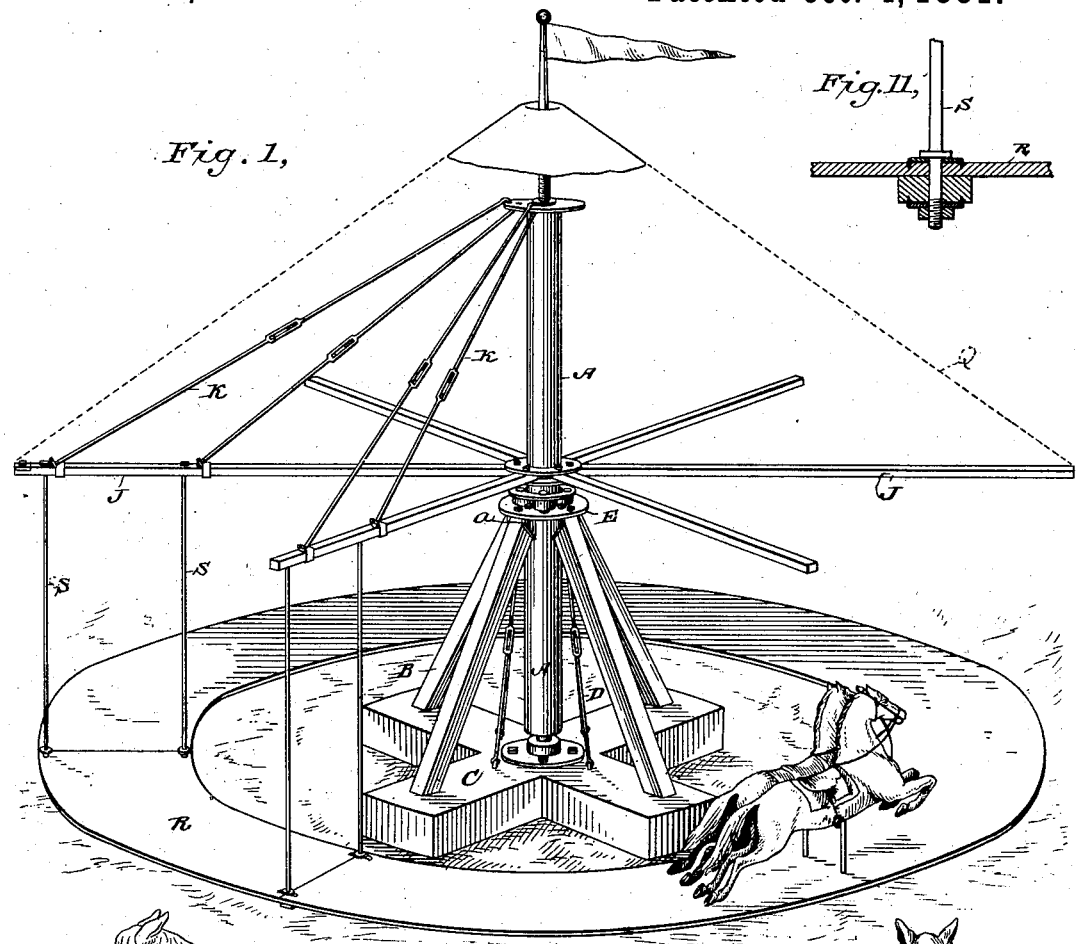
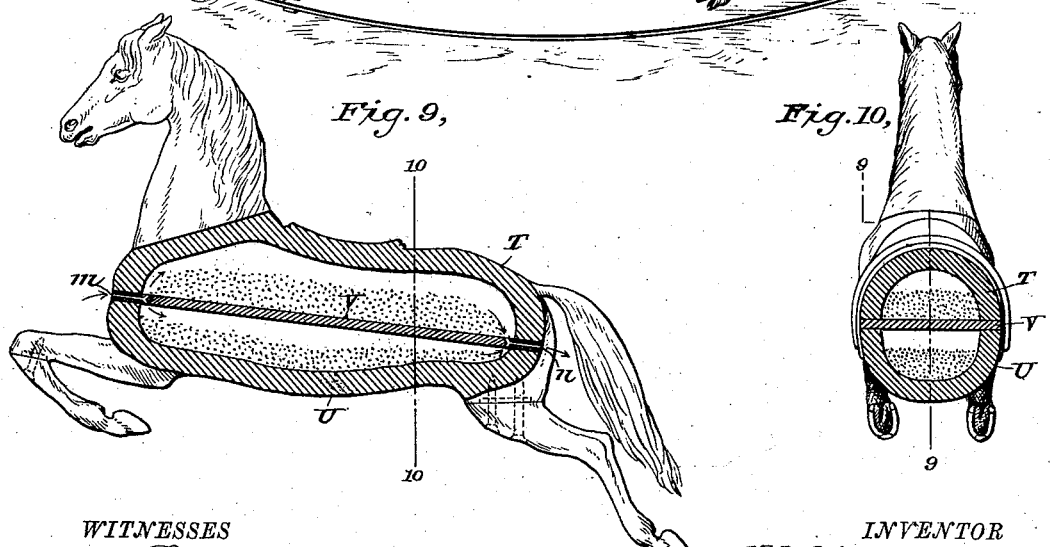
WITNESSES
A. M. Long
W. B. F. Keyser
By his Attorney
INVENTOR
Melchior Thöni
A. M. Tanner (No Model.) 2 Sheets—Sheet 2.
M. THÖNI.
ROUNDABOUT.
No. 247,858. Patented Oct. 4, 1881.
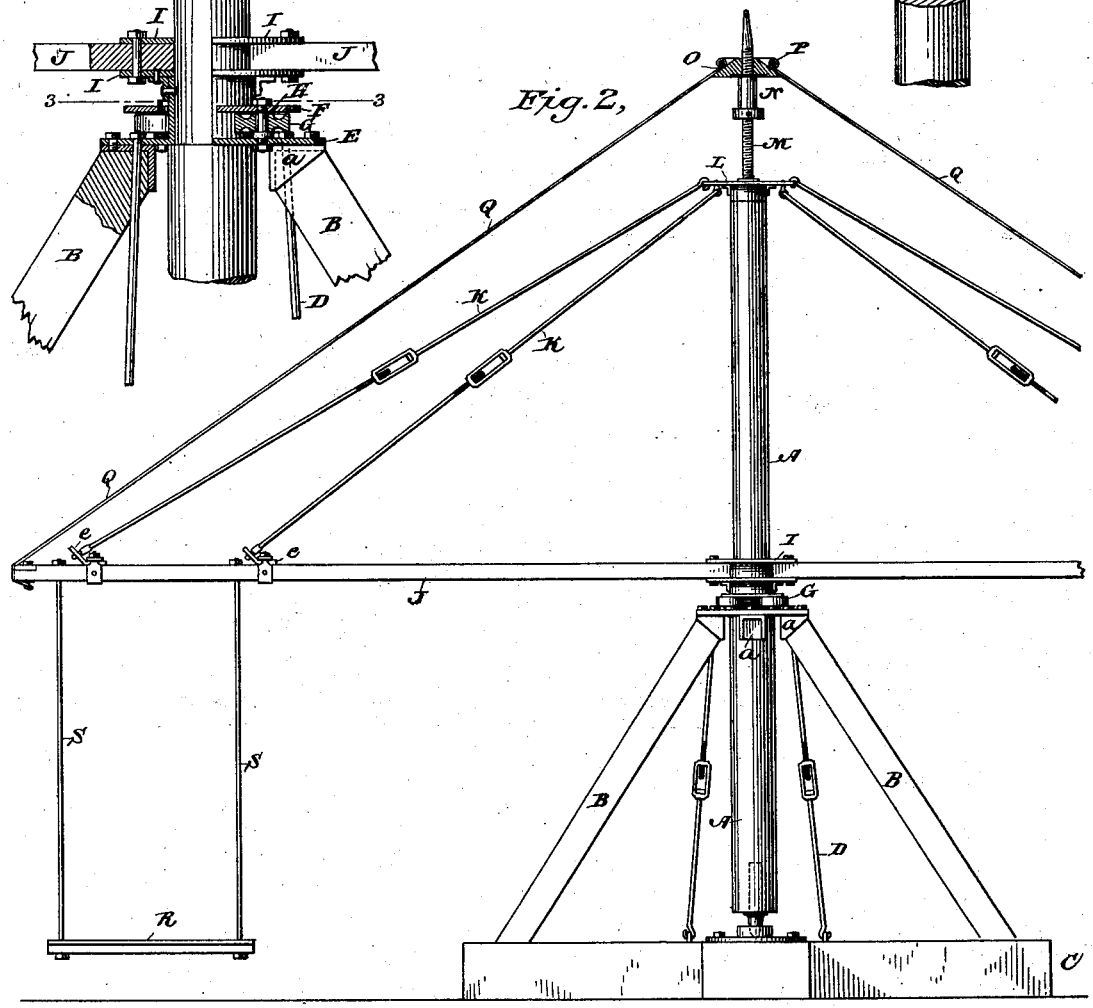
WITNESSES
INVENTOR
Melchior Thöni.
By his Attorney

UNITED STATES PATENT OFFICE.

MELCHIOR THÖNI, OF NASHVILLE, TENNESSEE.

ROUNDABOUT.

SPECIFICATION forming part of Letters Patent No. 247,858, dated October 4, 1881.

Application filed August 15, 1881. (No model.)

*To all whom it may concern:*

Be it known that I, MELCHIOR THÖNI, a citizen of Switzerland, residing at Nashville, in the State of Tennessee, have invented certain new and useful Improvements in Roundabouts; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

The present invention relates to that class of machines variously termed "carousals," "merry-go-rounds," and "roundabouts," and used for purposes of exercise and amusement.

The object of the invention is to provide an apparatus which shall be simple in construction, effective in operation, and capable of being easily and expeditiously erected and taken apart.

Another object of the invention is to provide figures of horses or other animals which are lighter and cheaper than others heretofore constructed, and not liable to be affected by exposure to rain or moisture.

The invention will first be fully described, and then set forth in the claims.

In the accompanying drawings, Figure 1 is a perspective view of a roundabout constructed according to my invention. Fig. 2 is an elevation, partly in section. Figs. 3 and 4 are detail views of the revolving column or shaft and friction-wheels. Fig. 5 is a detail sectional view of the means for supporting and adjusting the canopy or awning. Figs. 6, 7, and 8 are detail views of the means for connecting the guy-rods or stay-braces with the arms of the revolving column. Figs. 9 and 10 are sectional views of hollow animals having a moisture-absorbing filling. Fig. 11 show the means employed for connecting the vertical rods with the supporting-platform of the apparatus.

The letter A designates a vertical column or shaft, which is stepped at its lower end in a suitable base-sill or frame, C, and also has its bearing in a collar or ring-frame carrying friction-rollers, which is secured to the upper ends of inclined standards B, rising from the base or sill C. The ring-frame consists of a bottom plate or disk, E, which is apertured for the passage of the shaft A, and is provided or constructed with a series of bottom shoes or sockets, *a*, for receiving the ends of the standards B. The latter are retained in place by means of vertical rods or braces D, which pass through the plate E and standards B, and are attached to the base-sill, as is clearly shown in Figs. 4 and 5. An upper ring or collar, F, is the other member of the ring-frame, and anti-friction-rollers G, arranged between the two rings constituting said frame, are made to turn on bolts or spindles H, which are secured by screw-threaded shanks or ends and nuts, as is shown in Fig. 4. A series of arms, J, radiating from the shaft or column are secured thereto by means of horizontal flanges or collars I, which encircle said shaft, and are placed far enough apart to receive the inner ends of the arms J. Bolts passing through the collars I and arms serve to retain the latter. The arms J are braced or supported by means of guy or stay rods K, which extend from near the outer ends of said arms to a cap-plate or flange, L, surmounting the shaft or column A. The lower ends of the rods K are T-shaped, and provided with reduced portions *d*, as is shown in Fig. 6. The object of this construction is to enable the same to be conveniently connected with angular attaching-plates *e*, clipped to the arms J, as fully shown in Figs. 7 and 8. Said plates are provided with a narrow slit, *f*, and with a larger opening, *g*, below the same. By introducing the reduced portion of the brace D into said slit the head is brought in line with the opening *g*, and the enlarged portion *h*, connecting said head with the reduced portion *d*, is made to enter and fill the opening *g*, thus firmly and securely holding the brace-rod in place.

A vertical screw-threaded stem or spindle, M, attached to and rising from the cap-plate L, receives an adjustable screw-threaded sleeve or nut, N, and a cap or button, O, the latter resting above the sleeve N and being made separate therefrom. The button O is made conical or tapering, so as to receive an eyelet or re-enforced opening, P, at the top or apex of a canopy or awning, Q. The latter is made of canvas or other suitable material, and is attached at its bottom edge to the outer ends of the radial arms, while its eyeleted or re-enforced opening fits on the cap or button O, as already stated. By moving the sleeve on the screw stem or spindle the button is raised or lowered for stretching or loosening the awning, as may be desired.

A platform, R, suspended from the radial arm by rods or hangers S, serves to support figures of horses, deer, and other animals and carriages or seats of any approved construction. I contemplate using figures of animals, which, instead of being made hollow, as has heretofore been proposed, simply for the sake of lightness and cheapness, are designed for the reception of an absorbent filling, which will tend to absorb all moisture, and thus maintain the wood or other material of which the figures are constructed in a dry and perfect condition. The animals or figures herein shown are made of two sections, T U, which are cemented or otherwise secured to a central or intermediate board, V. The sections are hollowed or carved out, and the intermediate board is made solid, so as to impart the necessary degree of strength to the figure and divide the interior thereof into two chambers, as is fully shown in Figs. 9 and 10. The figures, instead of being made of wood, may be made of papier-maché, leather, or other material, a skeleton frame being in such cases covered with the papier-maché or leather. Openings m and n, made in the front and rear ends of the figures, serve to permit the passage of air therethrough, as will be manifest when it is stated that the absorbent filling never occupies the entire chamber in the animal's body and is not packed so as to retard said passage of air.

I am aware that it is not new to connect a storm tent or awning with the revolving frame of a carousal or roundabout, said storm-tent having a re-enforced opening at its apex for receiving the upper end of a swiveled mast.

Having thus described my invention, what I claim as new, and desire to secure by Letters Patent, is—

1. In a roundabout, the combination of the base-sill C, standards B, top plate, E, having shoes a, ring-plate F, friction-rollers G, and bolt-spindles H, passing through the plates E F, with the revolving column or shaft A, carrying radial arms and suspended platform, as herein set forth.

2. The combination of the screw-threaded spindle M, adjustable sleeve N, and adjustable tapering button O with the revolving shaft A, radial arms J, and canopy Q, as and for the purpose set forth.

3. In a roundabout, the combination of the brace or guy rods having cross-heads and reduced parts adjacent thereto, and the attaching-plates having slits and openings, in combination with the revolving shaft and radial horizontal arms extending from said shaft, as and for the purpose set forth.

4. A hollow animal or other figure having an absorbent filling, as and for the purpose set forth.

5. A hollow animal or other figure having air inlet and outlet openings, as and for the purpose set forth.

In testimony whereof I affix my signature in presence of two witnesses.

MELCHIOR THÖNI.

Witnesses:
W. B. T. KEYSER,
A. M. LONG.